(12) United States Patent
Panigrahi et al.

(10) Patent No.: US 9,860,318 B2
(45) Date of Patent: Jan. 2, 2018

(54) METHOD AND SYSTEM FOR OPTIMAL CACHING OF CONTENT IN AN INFORMATION CENTRIC NETWORKS (ICN)

(71) Applicant: TATA Consultancy Services Limited, Mumbai (IN)

(72) Inventors: Bighnaraj Panigrahi, Bangalore (IN); Samar Shailendra, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 195 days.

(21) Appl. No.: 14/966,611

(22) Filed: Dec. 11, 2015

(65) Prior Publication Data

US 2016/0173604 A1    Jun. 16, 2016

(30) Foreign Application Priority Data

Dec. 12, 2014 (IN) .......................... 4006/MUM/2014

(51) Int. Cl.
*G06F 15/167* (2006.01)
*H04L 29/08* (2006.01)

(52) U.S. Cl.
CPC ...... *H04L 67/1097* (2013.01); *H04L 67/2842* (2013.01); *H04L 67/2852* (2013.01)

(58) Field of Classification Search
USPC .................. 709/213, 241, 223; 711/133, 136
See application file for complete search history.

(56) References Cited

U.S. PATENT DOCUMENTS

| 6,266,742 B1 * | 7/2001 | Challenger ......... G06F 12/0888 711/133 |
| 2012/0041914 A1 * | 2/2012 | Tirunagari ............ G06F 12/121 706/15 |

(Continued)

FOREIGN PATENT DOCUMENTS

CN         103428267         12/2013

OTHER PUBLICATIONS

Wang, S. et al. "Caching in Information-Centric Networking," *AsiaFI Future Internet Technology Workshop*; 9 pages, (2011).

(Continued)

*Primary Examiner* — Tammy Nguyen
(74) *Attorney, Agent, or Firm* — Finnegan, Henderson, Farabow, Garrett & Dunner LLP (57) ABSTRACT

The present application provides a method and system for optimal caching of content in the Information Centric Networks (ICN) and a cache replacement based on a content metric value. The method and system comprises requesting for a plurality of content by a user to a nearest local or edge ICN cache router; delivering by the local or edge ICN cache router the requested plurality of content to the user if it is available in its cache; else forwarding the request for the plurality of content to any of intermediate ICN cache router for finding source of the requested plurality of content; downloading the plurality of content in its downstream path; and storing the downloaded plurality of content based on a content metric value derived by a content metric system (CMS) based on a plurality of network parameters for the requested plurality of content.

10 Claims, 5 Drawing Sheets

(56) References Cited

U.S. PATENT DOCUMENTS

| | | | |
|---|---|---|---|
| 2013/0111063 A1* | 5/2013 | Lee | H04L 45/125 709/241 |
| 2013/0198351 A1* | 8/2013 | Widjaja | H04L 67/2842 709/223 |
| 2014/0101387 A1* | 4/2014 | Grayson | G06F 12/128 711/136 |
| 2014/0129779 A1 | 5/2014 | Frachtenberg et al. | |

OTHER PUBLICATIONS

Rosensweig, E. et al., "Approximate Models for General Cache Networks," *2010 Proceedings IEEE INFOCOM*, San Diego, Ca; 9 pages, (2010).
Rossi, D. et al. "Caching performance of content centric networks under multi-path routing (and more)," *Relatório técnico, Telecom ParisTech*; 9 pages, (2011).
Martina, V. et al., "A unified approach to the performance analysis of caching systems," *2014 Proceedings IEEE INFOCOM*, Toronto, ON; 16 pages, (2014).
Pentikousis, K. et al., "Information-Centric Networking: Part II," *IEEE Communications Magazine*, vol. 50, pp. 15-17, (2012).

* cited by examiner

METHOD AND SYSTEM FOR OPTIMAL CACHING OF CONTENT IN AN INFORMATION CENTRIC NETWORKS (ICN)

CROSS-REFERENCE TO RELATED APPLICATIONS AND PRIORITY

The present application claims priority from Indian Patent Application No. 4006/MUM/2014, filed on Dec. 12, 2014, the entirety of which is hereby incorporated by reference.

TECHNICAL FIELD

The present application generally relates to Information Centric Networks (ICN). Particularly, the application provides a method and system for optimal caching of content in an Information Centric Networks (ICN).

BACKGROUND

In recent times, the demands from users and the requirements from the Internet have changed dramatically. Today, huge amount of data is generated and shared among the users on Internet in a variety of forms such as online streaming, live TV/videos, online gaming, etc. Currently, the Internet is primarily a point-to-point or host-to-host network where information is identified by its location on the network, while on the other hand the users are more concerned about the content rather than the location from where the content is being accessed. Moreover, huge amount of bandwidth is being wasted due to the content encapsulation or host based nature of the Internet. The increasing demand for scalable and efficient distribution of content has led to the development of future Internet architectures, such as Information Centric Networks (ICNs) and Software Defined Networks (SDNs). The Information Centric Networks (ICN) has been proposed as an alternative design for the Internet with a specific focus on content centric communication rather than host-to-host communication such as web browsing, telnet or ftp. This requires the content or ICN chunk, generally referred to as ICN level packet, to be cashed or stored at intermediate routers and/or switches en-route to the original server to satisfy the future demands for the same ICN chunks locally.

Prior art solutions provides various caching policies for example but not limited to Least Recently Used (LRU), First In First Out (FIFO), Random etc. A majority of existing solutions describing caching policies are not best suited for ICN networks as they are mostly inherited from the operating system paging policies. The policies described in prior art are also not optimal, such as they do not adjust themselves according to the traffic, location of the content, location of the user and the source, etc. In addition, prior art literature has never account for the underlying network characteristics, thereby various network parameters including distance from the content source, frequency of accessing content, number of outgoing links at the intermediate network devices including routers, cache size, accessibility of one or more of network devices, priority of the content provided by one or more of user, application and service provider were never given due consideration. Thereby most of the prior art caching policies are either sub-optimal or not suitable for ICN networks. Thus there is need for an optimal caching method and system for caching in ICN networks, which is generalized in nature, highly adaptable thus can be applied universally to various network and usage scenarios.

There is also a need for a system where a content-metric may be used as a function of various network parameters, and further enables users to include additional network parameters if required for metric calculations.

Prior art literature have illustrated various caching policies, however, a method and system for optimal caching of content in an Information Centric Networks (ICN) and a cache replacement based on content metric value that can adapt to the underlying network scenarios more suitable for the Information Centric Networks (ICN) is still considered as one of the biggest challenges of the technical domain.

OBJECTIVES OF THE INVENTION

In accordance with the present invention, the primary objective is to provide a method and system for an optimal caching of contents in an Information Centric Networks (ICN), which can be applied universally to various network and usage scenarios.

Another objective of the invention is to provide a method and system for optimal caching of content in the Information Centric Networks (ICN) which is generalized in nature and highly adaptable.

Another objective of the invention is to provide a method and system for a cache replacement based on content metric value that can adapt to the underlying network scenarios more suitable for the Information Centric Networks (ICN).

Another objective of the invention is to provide a content-metric which not only considers the interplay of various network parameters including distance from the content source, frequency of accessing content, number of outgoing links at the intermediate network devices including routers, cache size, accessibility of one or more of network devices, priority of the content provided by one or more of user, application and service provider, but also enables to include additional network parameters if required for metric calculations.

Other objects and advantages of the present invention will be more apparent from the following description when read in conjunction with the accompanying figures, which are not intended to limit the scope of the present disclosure.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for optimal caching of content in an Information Centric Networks (ICN), which can be applied universally to various network and usage scenarios.

The present application provides a method and system for a cache replacement based on content metric value that can adapt to the underlying network scenarios more suitable for the Information Centric Networks (ICN).

The present application provides a content-metric which not only considers the interplay of various network parameters including distance from the content source, frequency of accessing content, number of outgoing links at the intermediate network devices including routers, cache size, accessibility of one or more of network devices, priority of the content provided by one or more of user, application and service provider but also enables to include additional network parameters if required for metric calculations.

The present application provides a computer implemented method for optimal caching of content in an Information Centric Networks (ICN), wherein said method comprises processor implemented steps of requesting by a user (114), for a plurality of content to a nearest local/edge ICN cache router (IR-102); checking by the local/edge ICN cache router (IR-102), availability of the requested plurality of content in its cache; delivering by the local/edge ICN cache router (IR-102), the requested plurality of content to the user (114) if it is available in its cache; forwarding by the local/edge ICN cache router (IR-102) when the requested plurality of content is not available in its cache, the request for the plurality of content to any of intermediate ICN cache router (IR-104, and IR-106) of Information Centric Networks (ICN) for finding source (116) of the requested plurality of content; downloading the plurality of content in its downstream path after finding the source (116) of the requested plurality of content; and storing the downloaded plurality of content at the en-route ICN cache router (IR-102, IR-104, and IR-106) based on a content metric value derived by a content metric system (CMS) based on a plurality of network parameters for the requested plurality of content.

The present application provides a system for optimal caching of data in an Information Centric Networks (ICN); said system comprising a plurality of ICN cache router (IR-102, IR-104, and IR-106); an ICN controller and/or ICN resolver (C-112); and Internet routers, gateways, and name resolvers (R-108, and R-110); a user (114) and a source (116) of a plurality of content communicatively coupled with each other over the Information Centric Networks (ICN) or Internet.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, plurality of output devices and networking devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and content from a memory (such as a read-only memory and/or a random access memory) and writes (stores) instructions and content to the memory. Storage devices suitable for tangibly embodying computer program instructions and content include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and content from, and write (store)

programs and content to, a non-transitory computer-readable storage medium such as an internal disk (not shown) or a removable disk.

Any content disclosed herein may be implemented, for example, in one or more content structures tangibly stored on a non-transitory computer-readable medium. Embodiments of the invention may store such content in such content structure(s) and read such content from such content structure(s).

The present application provides a computer implemented method and system for optimal caching of content in an Information Centric Networks (ICN), which can be applied universally to various network and usage scenarios. The present invention provides the method and system for optimal caching of content in an Information Centric Networks (ICN) are described herein. The present invention also provides a method and system for a cache replacement based on content metric value that can adapt to the underlying network scenarios more suitable for the Information Centric Networks (ICN). The term data, content and ICN chunk are utilized interchangeably throughout the specification while having the same meaning, to bring the description context in conformity. The term node and router are used interchangeably throughout the specification while having the same meaning, to bring the description context in conformity. The method and system for optimal caching of content in the Information Centric Networks (ICN) and the method and system for the cache replacement based on content metric value may be implemented in a variety of network devices. The network devices utilized by the method and system for optimal caching of content in the Information Centric Networks (ICN) and the method and system for the cache replacement based on content metric value may include, but are not limited to routers, switches, and the like. The method and system for optimal caching of content in the Information Centric Networks (ICN) and the method and system for the cache replacement based on content metric value may be used for various networks, such as Information Centric Network (ICN), the Internet, Content Delivery Network (CDN), Content Centric Networking (CCN) or Named Data Networking (NDN). Although, the description herein is with reference to certain communication networks and network devices, the systems and methods of the present subject matter may be implemented in other networks and devices, albeit with a few variations, as will be understood by a person skilled in the art.

The architecture of today's Internet was envisaged in early 1960s. In those days, the primary problems to resolve were peer-to-peer communication and remote access of shared resources. In the existing Internet architecture, every host is identified using an Internet Protocol (IP) address and the corresponding services are identified using a port number assigned to them. A tremendous growth has been envisaged in the Internet for last few decades and the Internet architecture has proved its stability over time. However, in recent times, the demands from users and the requirements from the Internet have changed dramatically. Today, huge amount of content is generated and shared among the users every day; such as social networks, online streaming, live TV/videos, online gaming, and likewise. Moreover, huge amount of bandwidth is being wasted due to the content encapsulation or host based nature of the Internet. Hence, a new design paradigm has emerged called Information Centric Networks (ICN) or Content Centric Networking (CCN).

Architecting this new paradigm is not easy and coexistence of the present Internet as well as ICN is the need of the hour. The new ICN architecture needs to carefully examine issues like naming, routing, caching, security, reliability, and integrity of the contents being accessed. Since the content transfer is the key, real benefit of ICN architecture is in the terms of improving network usage, Quality of Services (QoS), and minimizing cost of operation and deployment. These can be achieved if the content is fetched locally, instead of accessing it from the original source every time the same content is being requested. In other words, the intermediate nodes and/or routers en-route, may cache the content for any future demand of the same content. If a request for the same content is received by such a node and/or router, the user is served by the local copy of the corresponding content rather than getting it all the way from the original content source. However, it is not practical to cache all the content on every node and a policy should be defined which content should be cached, when and where. Therefore, caching should be performed intelligently and optimal caching policies should be defined specific to ICN networks.

Figure 1:
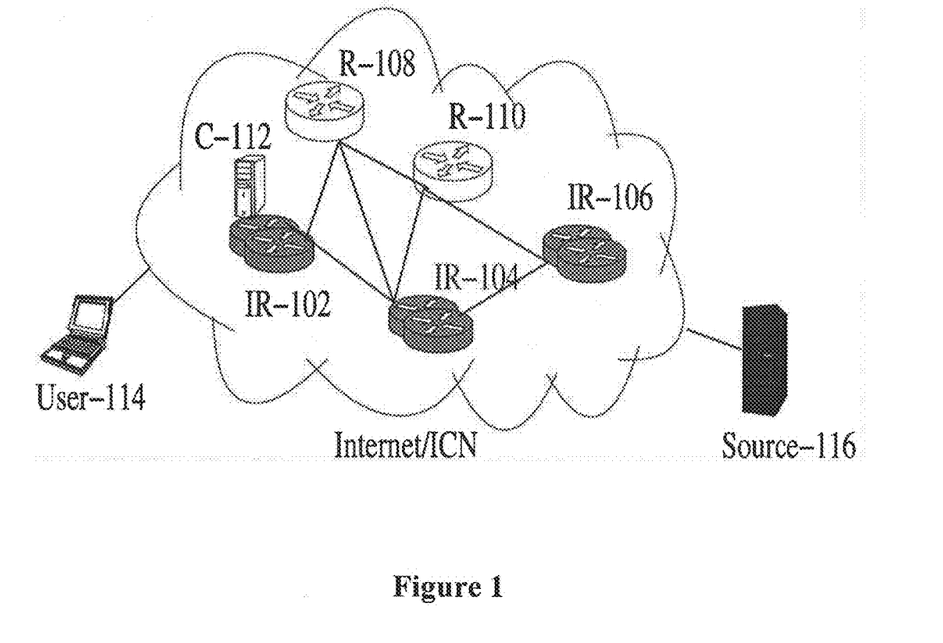
FIG. 1: shows a diagram illustrating system architecture for optimal caching of content in an Information Centric Networks (ICN)

The manner in which the method and system is implemented, to enable optimal caching of content at routers and/or switches en-route in an Information Centric Networks (ICN) and a cache replacement based on content metric value, shall be explained in details with respect to the FIG. 1. While aspects of described method and system have been explained for ICN, the present subject matter may be implemented in other networks and devices, albeit with a few variations, as will be understood by a person skilled in the art, can be implemented in any number of different computing systems, communication environments, and/or configurations, the embodiments are described in the context of the following method and system.

FIG. 1: shows a diagram illustrating system architecture for optimal caching of content in an Information Centric Networks (ICN).

In an embodiment of the present invention, a system is provided for optimal caching of contents at routers and/or switches en-route in an Information Centric Networks (ICN), which can be applied universally to various network and usage scenarios. The present application also provides a method and system for a cache replacement based on content metric value that can adapt to the underlying network scenarios more suitable for the Information Centric Networks (ICN).

In another embodiment of the present invention, system for optimal caching of content at routers and/or switches en-route in an Information Centric Networks (ICN) is provided which can adapt to the underlying network scenarios. Since it is certain that the ICN and the current Internet may co-exist, ICN capable devices, such as ICN Router, ICN Controller, ICN Resolver, etc., will co-exist in the network along with the existing network devices, such as Routers, Gateways, Name Resolvers, etc. The proposed system for optimal caching of content at routers and/or switches en-route in an Information Centric Networks (ICN) is a part of the ICN router functionalities and the ICN Routers can be any Internet router with extra cache and ICN specific interfaces.

In another embodiment of the present invention, system for optimal caching of content in an Information Centric Networks (ICN) comprises of network devices including ICN capable devices, ICN cache Router (IR-102, IR-104, and IR-106); ICN Controller and/or ICN Resolver (C-112); and Internet Routers, Gateways, and Name Resolvers (R-108, and R-110); a user (114) and a source (116) of a plurality of content. The proposed system for optimal caching of content in an Information Centric Networks (ICN)

may be part of the ICN router functionalities. The ICN cache Router (IR-102, IR-104, and IR-106) may be any of the Internet router with extra cache and ICN specific interfaces.

In another embodiment of the present invention, said plurality of content is requested by the user (114) to the nearest local/edge ICN cache router (IR-102).

In another embodiment of the present invention, the availability of the requested plurality of content is checked by the local/edge ICN cache router (IR-102) in its own cache.

In another embodiment of the present invention, the requested plurality of content is delivered by the local/edge ICN cache router (IR-102) to the user (114) if it is available in its own cache.

In another embodiment of the present invention, the a request for the plurality of content is forwarded by the local/edge ICN cache router (IR-102) to any of intermediate ICN cache router (IR-104, and IR-106) of the Information Centric Networks (ICN) for finding source (116) of the requested plurality of content, when the requested plurality of content is not available in its own cache.

In another embodiment of the present invention, the plurality of content is downloaded in its downstream path after finding the source (116) of the requested plurality of content.

In another embodiment of the present invention, the downloaded plurality of content is stored at the en-route ICN cache router (IR-102, IR-104, and IR-106) based on a content metric value derived by a content metric system (CMS) based on a plurality of network parameters for the requested plurality of content. The content metric system (CMS) may be a part of the network device. The plurality of network parameters are selected from a group comprising of but not limited to distance of the user (114) from the content source (116), frequency of accessing content by the user (114), number of outgoing links at the intermediate network devices including en-route ICN cache routers (IR-102, IR-104, and IR-106, R-108 and R-110), cache size of the network devices (IR-102, IR-104, and IR-106), accessibility of one or more of network devices (IR-102, IR-104, and IR-106, R-108 and R-110), priority of the content provided by one or more of user, application and service provider and a combination thereof.

In another embodiment of the present invention, the Content Metric System (CMS) is adapted to assign a rank to every content (ICN chunk) which arrives at any of the ICN cache routers (IR-102, IR-104, and IR-106). Based upon this rank assigned to that content, the ICN cache routers let the newly arrived content pass through itself either without caching or replaces the old content with the new one. An optimal CMS system assigns a metric $C_M(k)$ to every chunk k. The value of ($C_M(k)$) is a function of various parameters as specified in (1):

$$C_M(k) = f(D_S(k), F_A(k), N_L(k), P_U(k)),\quad (1)$$

Where,
$D_S(k)$=Distance of the router in concern from the origin of data,
$F_A(k)$=Frequency of access of a data at the concerned router,
$N_L(k)$=Number of outgoing link from the node or router,
$P_U(k)$=User given priority, which can be decided based on the type of traffic or QoS associated with the content.

It has been assumed that the maximum distance to the farthest source in the network is $D_{max}$ (in terms of maximum hops allowed in Internet deployment), while the maximum observed frequency of access of any data on that route is $F_{max}$. When a new ICN content arrives, $F_A(k)$ is set to 1. Hence, the CM(k) of any chunk k arriving on a router is calculated as follows:

$$C_M(k) = \left(\frac{c_d \cdot D_s(k)}{D_{max}} + \frac{c_f \cdot 1}{F_{max}} + c_b \cdot C_B(n) + c_p \cdot P_U(k)\right), \quad (2)$$

Where, $c_d$, $c_f$, $c_b$, and $c_p$ are the constants of proportionality and $C_B(n)$ is the betweenness parameter of ICN router n.

$$C_B(n) = \sum_{i \neq n \neq j} \frac{N_{i,j}(n)}{N_{i,j}}, \quad (3)$$

where,
$N_{i,j}$=Number of content delivery paths between any node i and node j,
$N_{i,j}(n)$=Number of content delivery paths between any node i and node j that pass through ICN router/switch n.

Every time the content is accessed again, or a new chunk is arrived, the content metric $C_M(k)$ is updated using the following equation:

$$C_M^{new}(k) = C_M^{old}(k) + \left(\frac{c_f}{F_{max}}\right)$$

In another embodiment of the present invention, the downloaded plurality of content is stored at the en-route ICN routers (IR-102, IR-104, and IR-106) and edge ICN Router (IR-102) when the content metric value of the incoming stream plurality of content is higher than the content metric value of the existing cached plurality of content by way of replacing one of the existing cached plurality of content having minimum content metric value. In the ICN paradigm, the ICN routers (IR-102, IR-104, and IR-106) are having extra cache memories to store content locally. Storing content locally by the en-route ICN routers (IR-102, IR-104, and IR-106) intelligently helps reducing overall access time as well as the usage of network resources like bandwidth is also optimized. It will be appreciated by a person ordinarily skilled in this area, that the finite storage availability makes the cache replacement policy more challenging especially in ICN network. Due to finite storage capacity, caching mechanisms have to make a decision whether to replace an existing content with newly arriving content or simply let the content pass through the router/switch without caching. The performance of the network depends significantly upon the efficiency of the cache replacement policy.

In another embodiment of the present invention, the downloaded plurality of content is delivered to the user (114) without storing at en-route ICN routers (IR-102, IR-104, and IR-106) when the content metric value of the incoming stream of plurality of content is lower than the content metric value of the existing cached plurality of content at the en-route ICN routers (IR-102, IR-104, and IR-106).

In another embodiment of the present invention, the ICN routers (IR-102, IR-104, and IR-106) update the content metric values of the existing cached plurality of contents.

In another embodiment of the present invention, any of the ICN routers (IR-102, IR-104, and IR-106) may act as a nearest local/edge ICN cache router; and likewise any of the ICN routers (IR-102, IR-104, and IR-106) may act as an intermediate ICN cache router.

To avoid cache starvation, the content which is not being accessed/requested for a cache refreshed time, T will be discarded from the cache irrespective of its CM value. Therefore, each ICN chunk is assigned with a lifetime and will be discarded by the router if its lifetime expires.

In an implementation of the present subject matter, memory present in the one or more of network devices like a plurality of ICN cache router (IR-102, IR-104, and IR-106); an ICN controller and/or ICN resolver (C-112); and Internet routers, gateways, and name resolvers (R-108, and R-110) one or more of the fetched content, the content metric $C_M(k)$, $F_A(K)$, cached chunk and their combination thereof.

In accordance with various embodiments of the present invention, using the proposed method and system for optimal caching of content in an Information Centric Networks (ICN), the network resources are used optimally.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although embodiments for methods and systems for optimal caching of content in an Information Centric Networks (ICN) have been described in a language specific to structural features and/or methods, it is to be understood that the present subject matter is not necessarily limited to the specific features or methods described. Rather, the specific features and methods are disclosed as embodiments for optimal caching of content in an Information Centric Networks (ICN) in communication networks.

Figure 2:
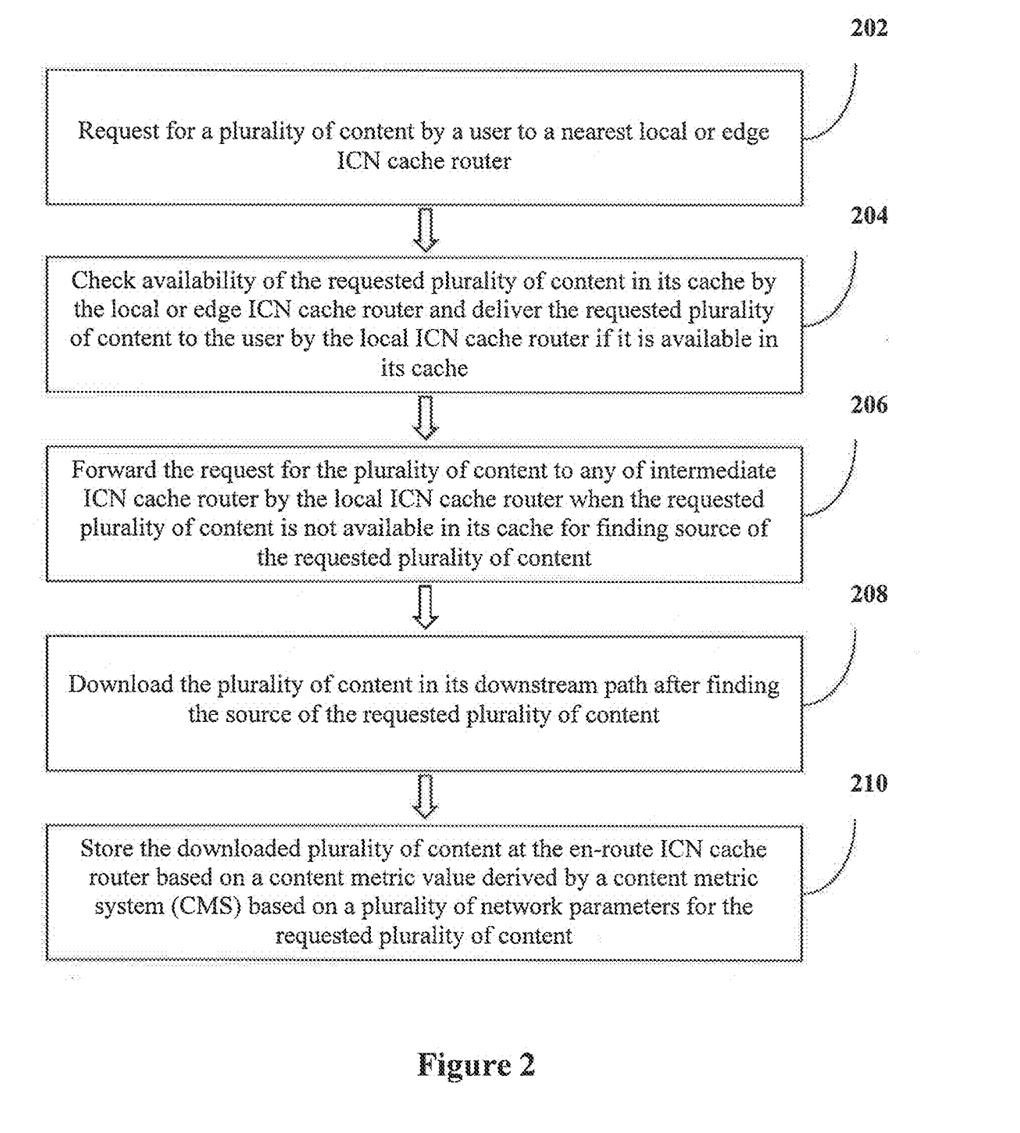
FIG. 2: shows a flow chart illustrating a method for optimal caching of content in an Information Centric Networks (ICN)

FIG. 2: shows a flow chart illustrating a method for optimal caching of content in an Information Centric Networks (ICN).

The process starts at step 202, a plurality of content is requested by a user to a nearest local/edge ICN cache router. At the step 204, availability of the requested plurality of content is checked in its cache by the local/edge ICN cache router and delivers the requested plurality of content to the user by the local/edge ICN cache router if it is available in its cache. At the step 206, request is forward for the plurality of content to any of intermediate ICN cache router by the local/edge ICN cache router when the requested plurality of content is not available in its cache for finding source of the requested plurality of content. At the step 208, the plurality of content is downloaded in its downstream path after finding the source of the requested plurality of content. The source of the requested plurality of content may be any intermediate ICN router or the original source of the requested plurality of content. The process ends at the step 210, the downloaded plurality of content is stored at the intermediate ICN cache router based on a content metric value derived by a content metric system (CMS) based on a plurality of network parameters for the requested plurality of content.

In another embodiment of the present invention, the performance results of the method and system for optimal caching of content in an Information Centric Networks (ICN) are presented in comparison to the LRU and FIFO caching policies.

In another embodiment of the present invention, verification of the method and system for optimal caching of content in an Information Centric Networks (ICN) is done wherein an ICN router is considered which on arrival of the requests either provides the data from the local cache or passes on the request to the neighboring router if the data is not available with it. While the response of a particular request passes through it may cache the data based upon the system for optimal caching of content in an Information Centric Networks (ICN).

In another embodiment of the present invention, ICN chunk (bundle) size of 2 KB and average link capacity as 2 Mbps are considered. The chunks arrive at the router is considered to be Poisson distributed with a mean arrival rate of 1000 chunks/second. Sufficient simulation runs have been conducted with 20 different seed values such as different traffic generations to have a confidence interval of +/−2% of the mean value with a confidence level of 95%. A significant improvement is demonstrated in resource utilization as well as increase in number of cache hits using the method and system for optimal caching of content in an Information Centric Networks (ICN) over other contemporary methods.

In another embodiment of the present invention, the plurality of content may be flushed from the cache at the en-route ICN cache router (IR-102, IR-104, and IR-106) based on the cache freshness time or life time T.

Figure 3:
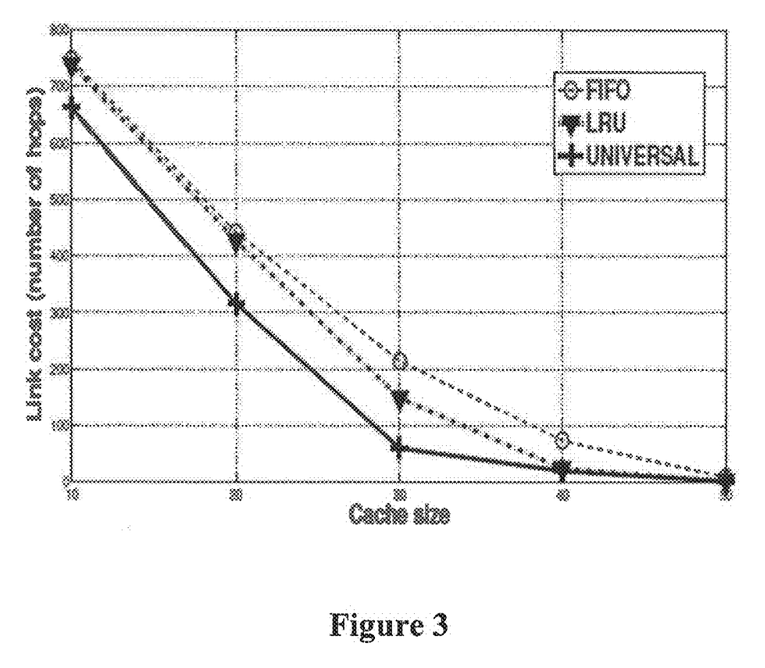
FIG. 3: shows a graphical representation for performance of the caching policies in terms of average link cost with variable cache size.
Figure 4:
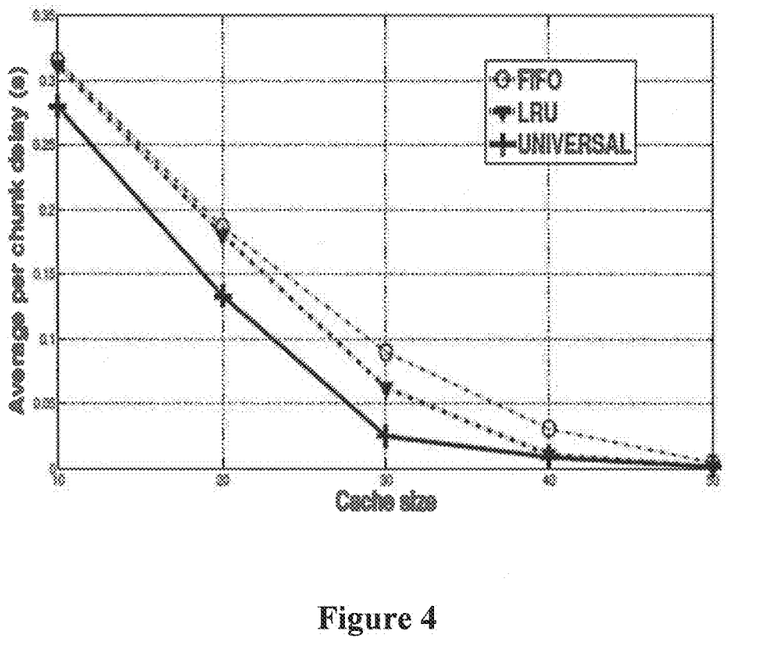
FIG. 4: shows a graphical representation for performance of the caching policies in terms of per ICN chunk delay with variable cache size.
Figure 5:
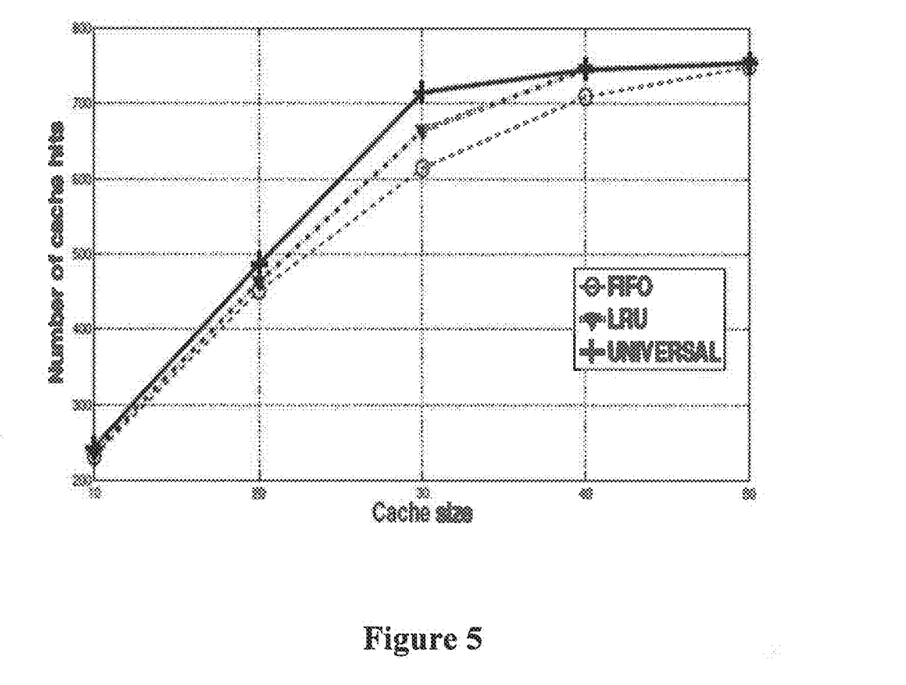
FIG. 5: shows a graphical representation for performance of caching policies in terms of average cache hits with cache size.

In another embodiment of the present invention, from FIG. 3 to FIG. 5 illustrates performance results of the method and system for optimal caching of content in an Information Centric Networks (ICN) in comparison to the exiting caching policies Least Recently Used (LRU) and First In First Out (FIFO).

Referring to FIG. 3 is a graphical representation for performance of the caching policies in terms of average link cost with variable cache size.

In another embodiment of the present invention, the average link cost used for different cache sizes using LRU, FIFO, and optimal caching disclosed herein are presented. It is observed that the link cost for optimal caching disclosed in present invention is less than other two policies, because unlike LRU and FIFO, in optimal caching disclosed herein, any ICN chunk arriving from a distant source will have higher content metric value. This reduces the number of cache miss for the contents from distant source and serves the ICN chunks from the local cache and hence in turn improves the overall link cost. It should be noted that as the cache size increases the link cost for each policy tends to be equal because at higher cache sizes there is nearly no cache miss for all the policies.

Referring to FIG. 4 is a graphical representation for performance of the caching policies in terms of per ICN chunk delay with variable cache size.

In another embodiment of the present invention, the average transfer delay per ICN chunk for different cache sizes is plotted. The results show that the average delay also follows similar trends as in the link cost plot. This is quite intuitive as link cost will directly affect delay. In case of optimal caching disclosed herein the requests are served from the local cache rather than fetching it from the sources every time in an intelligent and optimal manner. Hence, the mean delay encountered by ICN chunks is much smaller than in case of LRU or FIFO policies.

Referring to FIG. 5 is a graphical representation for performance of caching policies in terms of average cache hits with cache size.

In another embodiment of the present invention, the average number of cache hits is higher in case of optimal caching disclosed herein. It should be noted that, in certain scenarios it may be possible that the number of cache hits with LRU are more than that with optimal caching disclosed herein. However optimal caching disclosed herein outperforms in terms of the resource utilization and delay in the network. This is due to the fact that LRU, FIFO, etc., are local optimal policies whereas optimal caching disclosed herein is a both global and local optimal policy with a consolidated view of the complete network topology.

What is claimed is:

1. A method for optimal caching of content in an Information Centric Networks (ICN); said method comprising processor implemented steps of:
   a. requesting by a user (114), for a plurality of content to a nearest local or edge ICN cache router (IR-102);
   b. checking by the local or edge ICN cache router (IR-102), availability of the requested plurality of content in its cache and delivering by the local or edge ICN cache router (IR-102), the requested plurality of content to the user (114) if it is available in its cache;
   c. forwarding by the local or edge ICN cache router (IR-102) when the requested plurality of content is not available in its cache, the request for the plurality of content to any of intermediate ICN cache router (IR-104, and IR-106) of Information Centric Networks (ICN) for finding source (116) of the requested plurality of content;
   d. downloading the plurality of content in its downstream path after finding the source (116) of the requested plurality of content; and
   e. storing the downloaded plurality of content at the en-route ICN cache router (IR-102, IR-104, and IR-106) based on a content metric value derived by a content metric system (CMS) based on a plurality of network parameters for the requested plurality of content.

2. The method as claimed in claim 1, wherein the downloaded plurality of content is stored at the en-route ICN cache router (IR-102, IR-104, and IR-106) when the content metric value of the incoming stream of plurality of content is higher than the content metric value of the existing cached plurality of content by way of replacing one of the existing cached plurality of content having minimum content metric value.

3. The method as claimed in claim 1, wherein the downloaded plurality of content is delivered to the user (114) without storing at the en-route ICN cache router (IR-102, IR-104, and IR-106) when the content metric value of the incoming stream of plurality of content is lower than the content metric value of the existing cached plurality of content.

4. The method as claimed in claim 1, wherein the plurality of network parameters are selected from a group comprising of distance of the user (114) from the content source (116), frequency of accessing content by the user (114), frequency of fetching content, number of outgoing links at the intermediate network devices including ICN cache routers (IR-102, IR-104, and IR-106, R-108 and R-110), cache size of the network devices (IR-102, IR-104, and IR-106), accessibility of one or more of network devices (IR-102, IR-104, and IR-106, R-108 and R-110), priority of the content provided by one or more of user (114), application and service provider and a combination thereof.

5. The method as claimed in claim 1, further comprises of updating the content metric value of the existing cached plurality of content by the ICN routers (IR-102, IR-104, and IR-106).

6. The method as claimed in claim 1, further comprises of flushing the plurality of content from the cache at the en-route ICN cache router (IR-102, IR-104, and IR-106) based on the cache freshness time or life time T.

7. A system for optimal caching of data in an Information Centric Networks (ICN); said system comprising a plurality of ICN cache router (IR-102, IR-104, and IR-106); an ICN controller and/or ICN resolver (C-112); and Internet routers, gateways, and name resolvers (R-108, and R-110); a user (114) and a source (116) of a plurality of content communicatively coupled with each other over the Information Centric Networks (ICN) or Internet.

8. The system as claimed in claim 7, wherein a nearest local or edge ICN cache router (IR-102) out of the plurality of ICN cache router, adapted for:
   a. receiving a request by the user (114) for a plurality of content;
   b. checking availability of the requested plurality of content in its cache;
   c. delivering the requested plurality of content to the user (114) if it is available in its cache;
   d. forwarding the request for the plurality of content to any of intermediate ICN cache router (IR-104, and IR-106) of information Centric Networks (ICN) for finding source (116) of the requested plurality of content when the requested plurality of content is not available in its cache;
   e. downloading the plurality of content in its downstream path after finding the source (116) of the requested plurality of content.

9. The system as claimed in claim 7, wherein any of en-route ICN cache router (IR-102, IR-104, and IR-106) of Information Centric Networks (ICN) out of the plurality of ICN caching router, adapted for storing the downloaded plurality of content based on a content metric value derived by a content metric system (CMS) based on a plurality of network parameters for the requested plurality of content.

10. A non-transitory computer readable medium comprising program codes executable by at least one processor for optimal caching of content in an Information Centric Networks (ICN), the program codes comprising:
   a. a program code for requesting by a user (114), for a plurality of content to a nearest local or edge ICN cache router (IR-102);
   b. a program code for checking by the local or edge ICN cache router (IR-102), availability of the requested plurality of content in its cache and delivering by the local or edge ICN cache router (IR-102), the requested plurality of content to the user (114) if it is available in its cache;
   c. a program code for forwarding by the local or edge ICN cache router (IR-102) when the requested plurality of content is not available in its cache, the request for the plurality of content to any of intermediate ICN cache router (IR-104, and IR-106) of Information Centric Networks (ICN) for finding source (116) of the requested plurality of content;
   d. a program code for downloading the plurality of content in its downstream path after finding the source (116) of the requested plurality of content; and
   e. a program code for storing the downloaded plurality of content at the en-route ICN cache router (IR-102, IR-104, and IR-106) based on a content metric value derived by a content metric system (CMS) based on a plurality of network parameters for the requested plurality of content.

* * * * *